May 24, 1955

W. S. HALSTEAD

SUBSCRIPTION RADIO BROADCASTING SYSTEM AND EQUIPMENT THEREFOR 2,709,254

Filed Aug. 14, 1950

5 Sheets-Sheet 1

INVENTOR
WILLIAM S. HALSTEAD
BY
ATTORNEY

INVENTOR
WILLIAM S. HALSTEAD
BY [signature]
ATTORNEY

May 24, 1955

W. S. HALSTEAD
SUBSCRIPTION RADIO BROADCASTING
SYSTEM AND EQUIPMENT THEREFOR 2,709,254

Filed Aug. 14, 1950

5 Sheets-Sheet 3

INVENTOR
WILLIAM S. HALSTEAD
BY
ATTORNEY

May 24, 1955

Filed Aug. 14, 1950

W. S. HALSTEAD

SUBSCRIPTION RADIO BROADCASTING SYSTEM AND EQUIPMENT THEREFOR 2,709,254

5 Sheets-Sheet 4

INVENTOR
WILLIAM S. HALSTEAD
BY [signature]
ATTORNEY

May 24, 1955 W. S. HALSTEAD 2,709,254

SUBSCRIPTION RADIO BROADCASTING SYSTEM AND EQUIPMENT THEREFOR

Filed Aug. 14, 1950 5 Sheets-Sheet 5

INVENTOR
WILLIAM S. HALSTEAD
BY
ATTORNEY

United States Patent Office 2,709,254

Patented May 24, 1955

2,709,254

SUBSCRIPTION RADIO BROADCASTING SYSTEM AND EQUIPMENT THEREFOR

William S. Halstead, Mount Kisco, N. Y., assignor to Multiplex Development Corporation, County of New York, N. Y.

Original application June 23, 1950, Serial No. 170,011, now Patent No. 2,696,611, dated December 7, 1954. Divided and this application August 14, 1950, Serial No. 179,195

11 Claims. (Cl. 343—200)

This invention pertains to a multiplex communications system and more particularly to such systems in which security of reception is required in connection with certain of the channels or programs of the several channels or programs included in the multiplex system as a whole. This application is a division of the copending application Serial Number 170,011, filed June 23, 1950, entitled Multiplex Communications System.

The invention is especially applicable for use in connection with subscription radio services in which specialized programs are disseminated by multiplex technique, employing existing frequency modulation (FM) broadcast or television stations, without interfering with the public broadcasts of these stations. These special multiplex programs are intended for reception only by subscribers or specific groups of listeners equipped with signal-controlled receivers of special type.

The special programs may consist of background music devoid of commercial announcements; specific types of music, (i. e. classical, popular); specific types of informational programs; including continuously recurrent news bulletins, weather reports, time announcements; and programs addressed to certain groups of listeners in different portions of a broadcast service area. These special multiplex transmissions will be inaudible to listeners to the regular aural broadcasts of the stations, which will retain their normal high-fidelity transmission characteristics extending between 30 and 15,000 cycles. Subscribers or other authorized listeners, will by the system of the invention, be able to receive either the regular aural broadcasts of the stations or the specialized programs. In the latter instance, the subscribers will be able to have a choice of type of music or they may, by operating a selector device, receive a specific type of program such as an ever-available news summary, weather report or time announcement.

The system of the invention is intended to provide supplementary sources of revenue to FM broadcast stations which, today, are operating at a loss in the great majority of communities throughout the United States. It is anticipated that subscribers to the special multiplex services will pay nominal fees which will be of aid in strengthening the economic status of the stations, thereby enabling them to provide increasingly better public-service programs on their main, or public broadcast, channels.

To ensure against "pirating" of these specialized programs by individuals or groups who may not be willing to share in the cost of providing the multiplex services, means are included in the invention whereby a form of security is given to the multiplex transmissions by making it difficult or impossible for non-subscribers to receive the special programs without interference or distortion by intruding or interfering signals which, at authorized or subscriber receiving points, will not be reproduced.

The present invention provides a large number of advantages and practical applications, among which are the following:

A program of aural, radioprinter or other form of intelligence, such as television, addressed to subscribers within the service area of an FM broadcast station, may be superimposed at ultrasonic frequencies on the main carrier of the FM station without causing interference with the main program transmission of the station in the range, say, between 30 and 15,000 cycles, and without requiring the addition of filter units in conventional broadcast receivers within the service area of the transmitter.

One or more subcarriers in the inaudible frequency range above 15,000 cycles may be superimposed on the carrier wave of an FM broadcast station without mutual interference between the two types of signals.

Security of reception of subscription-radio programs of a given type free from intrusion by vocal announcements or other undesired signals may be attained at authorized subscriber receiving points and the reception of these programs of specific type rendered difficult or impossible by non-subscribers.

Selection of specific types of multiplexed subscription-radio programs, such as background music, news summaries, or business messages, may be attained at will at the subscription-radio receiver attuned to a single broadcasting station.

The invention is not limited to the transmission of aural, graphic, or other intelligence, but is equally applicable to any remote control function, such as the control of remotely located machines and devices. As one example, it may be mentioned that signals suitable to control and operate engraving, accounting and computing machines may be transmitted by multiplex process in accordance with the invention.

In the drawings:

Fig. 1 shows, in combined block diagram and schematic circuit form, the means employed at the control transmitter of a radio broadcast station to effect simultaneous transmission of a plurality of programs, and the means employed to effect security of uninterrupted reception of subscription programs of specific type at subscriber receiving points, said subscription programs being devoid of vocal announcements.

Figure 1:
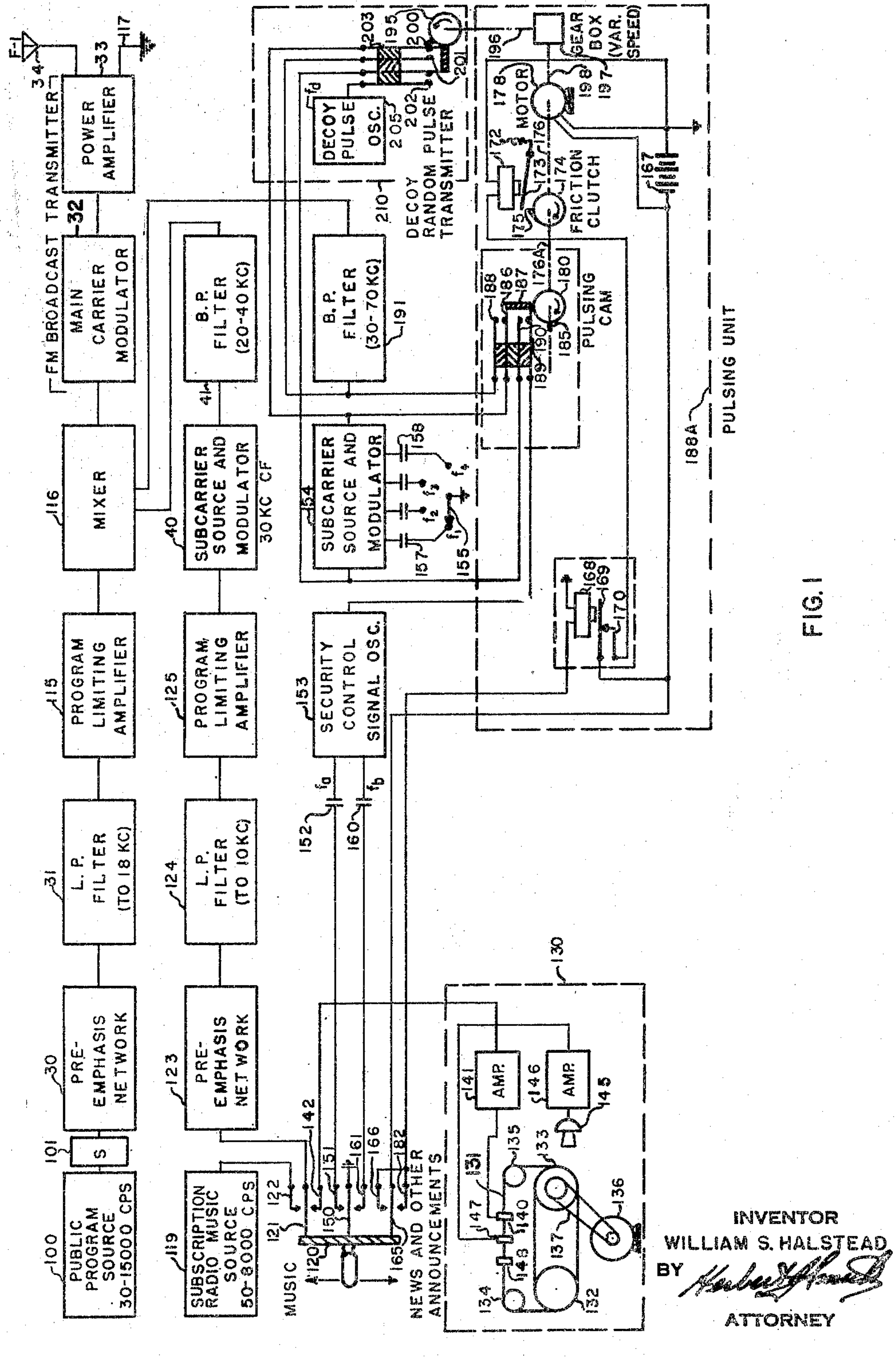

The diagram of Fig. 1 illustrates in block diagram and schematic form the means employed at the control station of the radio-relay network to effect simultaneous transmission of the public aural broadcast program and the subscription radio musical programs interspersed with recurrent news bulletins or other information together with security and decoy pulses.

The diagram of Fig. 1 specifically sets forth a presently preferred arrangement whereby security control signals may be transmitted automatically as short pulses in proper sequence from the control station to attain security of uninterrupted reception of music or other selected subscription radio programs at subscribed receiving points only. The security control signaling means is inclusive of a "decoy-pulse" transmitter having as a purpose the confusion of unauthorized persons who may attempt to ascertain the exact characteristics of the security-control pulses. The "decoy pulse" also causes improper operation of unauthorized subcarrier receiving equipment whereby it will be difficult or impossible for these unauthorized subcarrier receivers to maintain uninterrupted reception of the selected type of program for any substantial length of time.

Referring in detail to Fig. 1, aural program signals from a studio or other broadcast program source 100 and within the audio frequency range 30–15,000 cycles are applied through switching means 101 to preemphasis network 30; thence through low-pass filter 31, effective within the audio frequency range up to 18,000 cycles without attenuation to a program limiting amplifier 115, of any suitable well-known type, which may be employed to automatically maintain the level of the program signals within a predetermined operating ceiling. The aural program signals are then applied to a conventional mixer of any well-known type, the purpose of which is to permit application of signals from different sources to a common amplifier input circuit without disturbing the impedance relationship of any of the circuits and to permit independent regulation of the signal levels in either of the input channels as may be desired by an operator. The aural program signals are then applied to the main carrier modulator 32, which causes frequency modulation of radio wave energy at the output of transmitter or power amplifier 33 which supplies radio frequency energy at carrier frequency F1 to the antenna 34, with ground connections shown at 117.

The subscription radio music program within an illustrative audio frequency range between 50 and 8,000 cycles is supplied by a transcription source or other sound source 119. Selector switch 120 when positioned with arm 121 in the "up" or "music" position effects application of the subscription radio musical program signals through upper contact 122 to the input of a pre-emphasis network 123, which serves to emphasize the higher audio frequencies for the purpose of attaining an improvement in signal-to-noise ratio at subscription radio receiving points, as will be described in further detail in subsequent paragraphs. The subscription radio program signals are then applied through low-pass filter 124 to the program limiting amplifier 125, which serves to maintain the upper limits of the subscription radio program level within a predetermined ceiling for operational reasons as will be described in further detail in subsequent paragraphs. The subscription radio program signals are then applied to the input of a 30-kilocycle subcarrier source and modulator 40.

In one preferred arrangement of the system of the invention, the modulator is a narrow-band FM type having a frequency swing of plus or minus 8 kilocycles or less with constant amplitude of the subcarrier being retained during the modulation process; the modulated subcarrier varying in frequency between the range of approximately 22 and 38 kilocycles is applied to the input of band-pass filter 41 and thence is applied through mixer 116 to the main carrier modulator 32 of the broadcast transmitter's power amplifier 33.

When selector switch 120 is in the "down" or "news-announcement" position, voice signals which may emanate from a magnetic recorder-reproducer 130 of any suitable well-known type, are applied to the input of pre-emphasis network 123 and thereupon modulate the 30-kilocycle FM subcarrier. If recurrent transmission of news bulletins or other information is desired an endless-loop type of magnetic recorder-reproducer may be used. In this case, steel tape 131 is moved as an endless loop over the driving roller 133 and rollers 132, 134 and 135 by means of the electric motor 136 and driving belt 137. Pick-up head 140 is employed to convert recorded magnetic variations in the steel tape corresponding to the audio frequency variations of the impressed voice signal to variations in voltage, with subsequent amplification of the signal voltage by audio amplifier 141, the output of which is connected to lower contact 142 of switching means 120. Thus, a pre-recorded news bulletin containing a complete news digest is, by means of this equipment, automatically transmitted in repetitive manner as long as the selector switch 120 is in the "news" position.

Microphone 145 may be employed by an announcer in making a subsequent recording of later news bulletin. Speech amplifier 146 is employed in association with microphone 145 to amplify the voice signals to the required recording level when the voice signals are impressed on magnetic recording head 147. Alternatively, amplifier 146 may be connected directly to switch contact 142. Magnetic signal obliterating head 148 is utilized in association with the magnetic recorder in any conventional well-known manner to remove any previous recording.

Referring to program selector switch 120, it will be noted that arm 150 when in the "music" position applies a ground connection to upper contact 151, thereby completing the electrical circuit of which a frequency-determining capacitor 152 is a part; this circuit may be any conventional well-known audio frequency oscillating circuit 153 having a capacitor as one of the frequency-determining elements.

This oscillator which is of low frequency or audio frequency type has been termed a "security control signal oscillator" as its function is to supply a control signal of predetermined frequency for maintenance of security of uninterrupted reception of a selected type of program at subscription receiving points.

The security control signal of frequency $f_a$, such as 85 cycles, for example, is thereafter applied through switch contacts 189 and 190, when closed as will be described, to a subcarrier generator and modulator unit 154, operable at any of several designated frequencies within an illustrative frequency range extending between 30 and 70 kilocycles. Frequency control switch 155 when at position $f_1$ establishes a carrier frequency of 30 kilocycles, for example, by insertion of capacitor 157. When the frequency control switch 155 is at position $f_4$ capacitor 158 is inserted in the subcarrier generator circuit thereby establishing an upper subcarrier frequency of 70 kilocycles, for example.

The security control signal when at frequency $f_a$ causes either frequency modulation or amplitude modulation of the subcarrier, as desired, at a subcarrier frequency determined by the position of frequency-control switch 155.

It will be noted by referring to the illustration of program selector switch 120 that when arm 150 is in the "news" position, capacitor 160 is connected with ground through lower contact 161. This shifts the frequency of the security control signal oscillator 153 to a predetermined control frequency $f_b$, such as 87.5 cycles, or other frequency within a few cycles of the control frequency $f_a$ previously mentioned.

The lower control arm 165 of program selector switch 120 when in the "music" position engages upper contact 166 and thereby applies operating voltage to relay solenoid 168 from voltage source 167. Application of the voltage to this solenoid 168 moves relay armature 169 upward, opening the electrical circuit of which relay contact arm 170 is a part and thereby causes de-energization of solenoid 172 in series connection between electric power source 167, the relay armature 169 and contact 170. De-energization of solenoid 172 causes the release of latch armature 173 which when released, engages stop 175 of the driven clutch-disc 174, as in any well-known friction clutch, thereby preventing rotation of the driven disc 174. In other words, when solenoid 172 is de-energized, the latch 173 drops down to block the movement of the driven disc 174 of the friction clutch, the driving disc of which is rotated by the driving shaft 176 of electric motor 178. Under these conditions, the pulsing cam 180 attached to the driven disc 174 by means of shaft 176A remains in the idle position shown in the diagram.

Similarly, when program selector switch 120 is in the "news" position and the lower contact arm 165 engages with lower contact 182, the idle position of the pulsing cam, as shown in the diagram, is maintained for the reason that under these conditions voltage is applied to solenoid 168 and the armature 169 opens the circuit of which contact 170 is a part, thereby permitting latch armature 173 to remain in the down position, blocking the rotation of the driven disc 174 of the friction clutch.

At the completion of a musical selection intended for subscription radio listeners, program selector switch 120 is moved from the "music" position through the neutral position, as shown in the diagram of Fig. 1, to the "news" position. In passing through the neutral position energizing voltage is removed momentarily from solenoid 168. This releases relay armature 169 thereby closing the electrical circuit of which relay contact 170 is a part, thereby momentarily supplying voltage to solenoid 172 which causes the latch armature 173 to move upward, releasing the block from driven disc 174 of the friction clutch. This transitional condition is shown in Fig. 1. The raised point 185 on rotating pulsing cam 180 then moves the contact arms 189 and 186 of the pulsing switch 187 upward to their respective contacts 190 and 188, causing the momentary application of the security signal from audio oscillator 153 to subcarrier modulator 154 and thence to the input of band-pass filter 191, which is effective in passing without attenuation the subcarrier frequency range between 30 and 70 kilocycles. The security subcarrier, as a pulse, having a duration of a small fraction of a second, is then applied to mixer 116 via momentarily closed contact set 186–188, and thence to the main carrier modulator 32 of the FM broadcast transmitter 33.

It will be noted by referring to the arrangement of Fig. 1 that the momentary release of relay armature 169 occurs only during the very short interval during which the program selector switch 120 is moved between the "music" position and the "news" position. However, this transitional period is sufficient to effect the momentary release of armature 169 for a long enough time to allow latch 173 to permit rotation of the driven disc 174 of the friction clutch so that stop 175 clears the latch 173. Immediately thereafter relay armature 169 is pulled upward by application of power to relay solenoid 168 by the movement of switch 120 to the program position, opening the circuit of which contact 170 is a part and causing the downward movement of latch 173, with consequent blocking of rotation of driven disc 174 of the friction clutch after one revolution. In effect, this arrangement permits a pre-timed transmission of a single control pulse of short duration immediately upon termination of a given type of a multiplexed subscription radio program. Expressed in another way, this pulse is automatically transmitted for a short period during the transitional period between one type of multiplexed subscription program and another.

It will be noted, in addition, that the modulating frequency of the control pulse is at a predetermined frequency, such as $f_a$, when the selector switch 120 is in the "music" transmission position as the pulsing cam 180 effects closure of switch 187, and at a second modulating frequency $f_b$ when switch 120 is in the "news" position.

To make as difficult as possible the determination and effective utilization of the security pulse control signal at unauthorized receiving points, a series of decoy pulses is automatically transmitted at random intervals at the subcarrier frequency employed for security control purposes. The decoy pulse is automatically transmitted at variable intervals as determined by the irregular rotation of decoy pulse control cam 195. This cam is rotated at an irregular and unpredictable speed varying from time to time by means of slippage on drive shaft 196 connecting with gear box 197 of any well-known type, which is driven by shaft 198 attached to motor 178. The raised member 200 of decoy pulse control 195 when in contact with switch 203 causes the intermittent, momentary closure of contact sets 201 and 202 of switching means 203. Closure of contacts 202 applies a decoy frequency $f_d$, such as 80 cycles, from decoy pulse oscillator 205 to the input of subcarrier modulator 154 thereby modulating the subcarrier output. The decoy pulse oscillator may be an audio-frequency signal generator, similar in general electrical respect to the security control signal oscillator 153, and having an operating frequency within several cycles of the security control frequencies $f_a$ and $f_b$ or any other frequency as may be desired. Closure of contacts 201 momentarily shunts contacts 188 and 186 and causes the application of the subcarrier signal from modulator 154 to the input band-pass filter 191. In this instance it will be noted that the security subcarrier is modulated by the frequency of the decoy pulse oscillator 205. The security subcarrier cannot be modulated by the correct control frequency, however, until pulsing cam 180 is actuated as determined by program switch 120.

The effective operation of the security means, as described above, is such that a security control pulse of predetermined frequency $f_a$ or $f_b$ is emitted automatically as modulating component of the security subcarrier of predetermined frequency $f_1$, $f_2$, $f_3$, or $f_4$ during the transition between types of subscription programs while the decoy pulse $f_d$ at a slightly different audio modulating frequency is automatically transmitted at random by the automatic pulsing equipment above described and designated as the decoy pulse transmitter. In each instance, the security and decoy signals are in the nature of audio frequencies of low order, such as 83, 85, and 87 cycles, modulating a subcarrier which may be predetermined in frequency between 30 and 70 kilocycles. However, the security and decoy signals may be of frequencies below audibility, such as 20, 25, and 30 cycles. The duration and characteristic of the security control signals may be other than shown in this illustrative application. For example, the control signals may be of varying duration or weight to effect selective operation of relays or receivers responsive to pulses of varying duration or weight.

In operating the transmitting system of Fig. 1, the amplitudes of the different signals applied through the main carrier modulator 32 of transmitter 33, are adjusted so that the total modulation depth, and hence the frequency deviation, of the main carrier, produced concurrently by the different signals, is limited to a predetermined maximum value which is established by Government regulation and designated as 100% modulation (or frequency deviation) of the radio carrier wave emitted by a frequency-modulation broadcasting station.

In actual operating tests satisfactory results have been obtained with a modulation percentage of 10–20% (of the maximum value above mentioned) as applied to the main carrier when modulated by the combined subcarrier signals. The maximum modulation percentage of the main aural program signals, as applied to the main carrier, is usually in the range from 80% to 90% (of the mentioned maximum value) depending upon the degree of modulation effected by the subcarrier signals.

Inasmuch as any over-modulation of the main carrier is apt to cause "splatter" or other distortion at receiving points, the program limiting amplifiers 115 and 125 are useful in establishing pre-determined ceilings for the minimum signal levels in each channel leading to transmitter 33. Thus, the manual controls of program limiting amplifier 125 are set to limit the modulation percentage caused by the subcarrier signals to a maximum of 15%. The upper level of these signals will automatically be established and the operator at the transmitter need only attend to the main program channel, with its program limiting amplifier 115, adjustable in the manner of amplifier 125 serving as an aid in establishing upper modulating levels in this channel.

Figure 2:
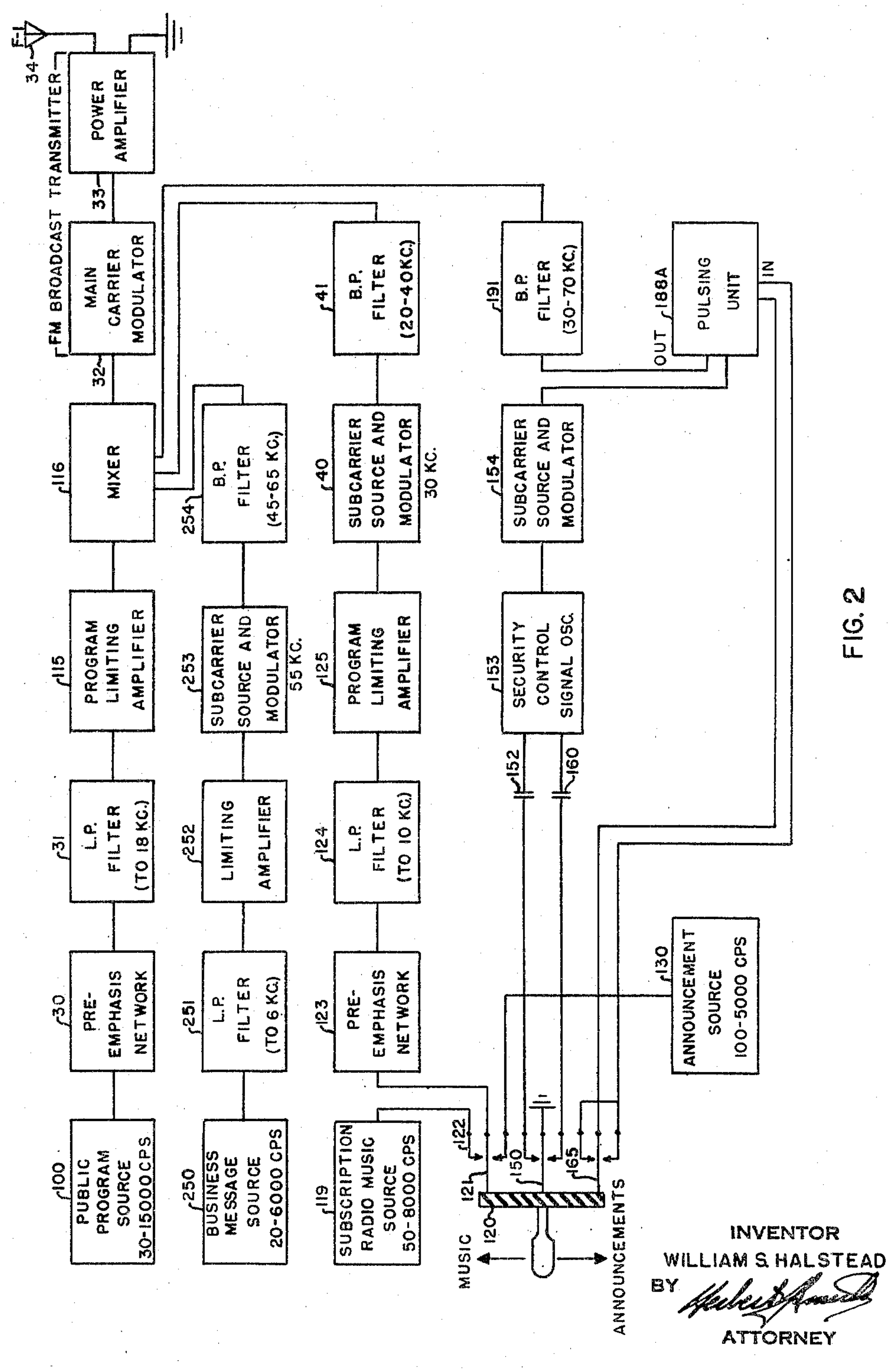
Fig. 2 illustrates in block diagram form an arrangement whereby three different types or sources of programs may be broadcast concurrently by an FM broadcast station on a common radio channel, with provision for a fourth source of program to be used alternately with one of the other sources.

Referring to Fig. 2, which is quite similar in many respects to the arrangement of Fig. 1, public program source 100 supplies aural program signals in the range 30–15,000 cycles through pre-emphasis network 30 to low-pass filter 31, thence to the program limiting amplifier 115 and mixer 116. From the mixer, the aural program signals are applied to the main carrier modulator 32 and the transmitter power amplifier 33 which supplies radio wave energy to omni-directional antenna 34 at frequency F–1.

A "business message" signal such as news bulletins, specialized information or radio-printer signals are applied from business message source 250 through low-pass filter 251 to limiting amplifier 252 and thence to a subcarrier source and modulator unit 253, operating at a mean subcarrier frequency of 55 kilocycles, for example. The modulated subcarrier is then applied through band-pass filter 254, effective to pass subcarrier energy in the band between 45–65 kilocycles to mixer 116 and thence to the FM broadcast transmitter including main carrier modulator 32 and power amplifier 33.

The subscription radio music source 119, identical to the source 119, Fig. 1, is employed as a source of audio signal energy in a second subcarrier channel. The audio frequency signals from subscription radio source 119 are passed through program selector switch 120 in the manner described in detail in connection with Fig. 1 and, when the selector switch 120 is in the "music" position, the subscription music signals are applied to pre-emphasis network 123, thence through low-pass filter 124, and program limiting amplifier 125 to subcarrier modulator unit 40. The modulated subcarrier signals, with center frequency of 30 kilocycles, for example, are then applied through band-pass filter 41, effective to pass carrier energy in the band 20–40 kilocycles without attenuation, to the mixer 116 and thence through the main carrier modulator 32 and power amplifier 33 to the antenna 34 as modulating components of the radio wave.

As has been described in connection with Fig. 1, the program selector switch 120 when in the "announcements" position applies voice signals from an announcement source 130.

Arms 150 and 165 of selector switch 120 are utilized in connection with the transmission of the security signals as has been described in preceding paragraphs. In this instance, the security control signal oscillator 153 is identical with that shown in Fig. 1, as are capacitors 152 and 160, respectively. The subcarrier source and modulator unit 154 is also identical with that of Fig. 1. The pulsing unit 188A and band-pass filter 191 are similar to those shown in detail in Fig. 1 and serve to apply the pulse signals within the range 30 to 70 kilocycles to mixer 116. For purpose of simplicity the decoy pulse arrangement has been omitted in this illustration, but it may be included as before.

By means of the system shown in Fig. 2 a total of three intelligence-bearing channels are employed in association with broadcast transmitter 33 and all channels may be activated simultaneously, each carrying its respective type of program, without interference between the channels and without causing interference with the reception of the main aural program of the transmitter in conventional FM broadcast receivers, provided the sum of the depths of modulation of the main carrier with its main program signals and with the various subcarriers is maintained within the 100% maximum, as previously described.

Figure 3:
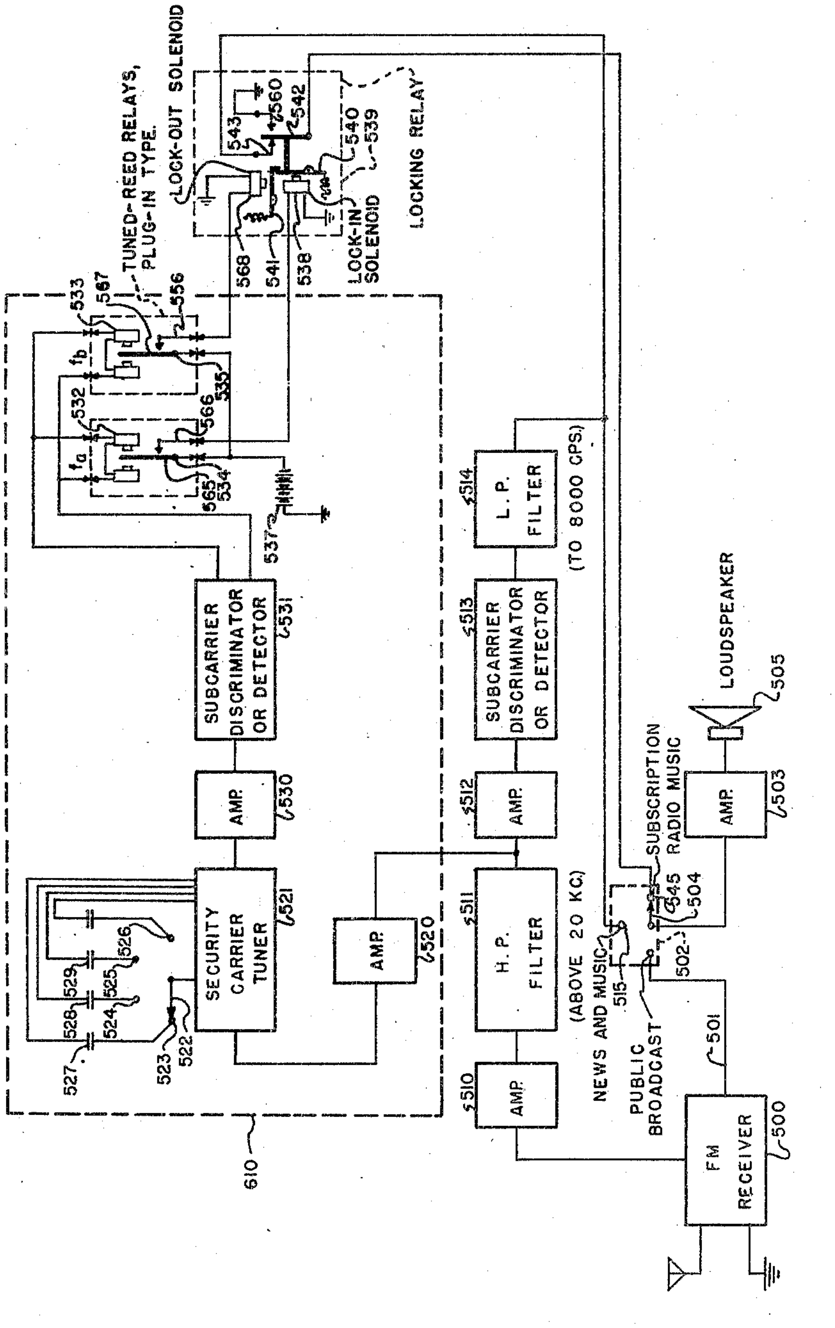
Fig. 3 is a combined block diagram and schematic diagram showing an arrangement of circuits and control components in a subscription radio receiving device whereby security of uninterrupted reception of a specific type of program, such as music, is made possible only at authorized receiving points.

Referring to Fig. 3, an illustrative arrangement of receiver circuit means at subscription radio receiving points is shown.

An FM broadcast receiver 500 is employed to receive the broadcast signals from the station, providing the subscription radio service in the area in which the receiver is located. The main aural program signals in the audio output 501 are applied to switching means 502 and thence to audio amplifier 503 and loud speaker 505 when the arm 504 of switching means 502 is in the position marked "public broadcast," for reproducing the main aural program.

The subscription radio program signals are derived from connection with the FM discriminator of broadcast receiver 500, as will be described in detail in subsequent paragraphs, and are applied through amplifier 510 to high-pass filter 511 which rejects the aural program signals below 20 kilocycles and passes only the subcarrier frequency above 20 kilocycles. The subcarrier signals are applied to amplifier or cathode follower 512 and the modulating components of the subcarrier are derived by the action of subcarrier discriminator or detector 513. The derived audio frequency signals are then passed through low-pass filter 514, which removes the subcarrier frequency and passes without attenuation the audio frequency signals within the audio frequency range up to 8 kilocycles, employed as the upper frequency in this instance. The output of low-pass filter 514 is applied to the "news and music" contact 515 of switching means 502. When the arm 504 of switching means 502 is in position at contact 515, the subcarrier program signals, consisting of music and news or other announcements are applied to the input of audio amplifier 503 and are reproduced by loud speaker 505.

The means employed in this illustrative application of the system of the invention to effect selective reception of subscription musical programs and to give uninterrupted aural reproduction of music, without voice announcements, is explained as follows:

The subcarrier signals at the output of high-pass filter 511 are passed through amplifier 520 to subcarrier detecting circuit identified as a security carrier tuner 521. This security carrier tuner is tuned to a predetermined security control carrier frequency as supplied by a subcarrier source 154, Fig. 1, at the broadcasting station.

Provision is shown in this illustrative diagram, Fig. 3, for tuning of the security carrier receiving means to any of four pre-selected subcarrier frequencies by the switching means of which arm 522 and contacts 523, 524, 525 and 526 are a part. When the switch arm 522 is in position at contact 523 for example, tuning condenser 527 is in the tuning circuit of any well known tuning arrangement in which a capacitor may be used to determine the resonant frequency, and similar condensers such as 528 and 529 are connected in the tuning circuit when the switch is in position at contacts 524 and 525 respectively.

By this means the security carrier tuner may be pretuned to respond to a designated security pulse at a given subcarrier frequency in the range between 30 and 70 kilocycles. Unless the switching arm 522 is at the correct position at a given time, the effective reception of the security subcarrier pulse will not be possible.

The received security subcarrier is amplified by amplifier 530 and the modulating components of the security subcarrier are derived by action of the subcarrier discriminator or detector 531. The audio frequency output of the subcarrier discriminator 531 is applied to the driving coils 532 and 533 of two tuned-reed relays 534 and 535 respectively.

Referring to Fig. 1, as has been described in preceding paragraphs when the program selector switch 120 is in the "music" position the security control signal of frequency $f_a$ is generated by the security control oscillator 153 so that when the raised point 185 of the pulsing cam 180 closes contact arms 183 and 186, and arms 189 and 190 the security subcarrier modulator unit 154 will be modulated by this specific control frequency, such as 87 cycles.

Referring to Fig. 3 when this specific modulating frequency $f_a$ is applied as a pulse to tuned reed relay 534, the tuned reed 565 is excited in response to this specific control frequency only and the electric circuit, of which reed 565 and contact 566 are parts, is closed, thereby applying electric power from source 537 to the lock-in solenoid 538 of the locking-relay 539.

The armature 540 of this relay is pulled toward the lock-in solenoid 538 and lock-in latch 541 thereafter holds the armature in the closed position as shown. Contact arm 542 of locking relay 539 then engages contact 543 and closes the audio frequency circuit between the output of low-pass filter 514 and contact 545 of switching means 502. Thus, when the switch arm 504 is in position at contact 545, identified as "subscription radio music" position, the received subscription radio musical program is applied to audio amplifier 503 and is reproduced by loud speaker 505 as long as the armature 540 of the locking relay 539 is in the "lock-in" position shown in Fig. 3.

At the end of transmission of the subscription program, the selector switch 120 Fig. 1 is thrown to the "announcing" position and the security control signal of frequency $f_b$ is caused to modulate the subcarrier pulse emitted by subcarrier modulator unit 154.

Upon movement of selector switch 120 from the "music" position to the "announcing" position, the pulsing cam 180 is caused to rotate as has been previously described and the security subcarrier modulated by control frequency $f_b$, such as 85 cylecs, is transmitted by the broadcast station.

At the receiver, 500, Fig. 3, as has previously been described in the above paragraphs, the security subcarrier is demodulated by subcarrier discriminator 531 and the modulating component, the security control signal of frequency $f_b$, causes the energization of tuned reed 567 when the exciting voltage is applied to coils 533 of tuned reed relay 535.

The agitation of the tuned reed 567 effects closure of the electrical circuit in which the reed 567 and contact 556 are parts. This causes electric power from source 537 to be applied momentarily to the "lock-out" solenoid 568 of locking relay 539. The latch 541 is thereupon pulled toward solenoid 568, releasing armature 540 of the lock-in section of relay 539, and thereby causing movement of contact armature of 542 to contact 560, connected to ground. The grounding of armature 542 causing the muting of the audio amplifier circuit of which amplifier 503 is a part and therefore no sound is heard from loud speaker 505 as long as voice announcements are being transmitted on the subscription program subcarrier. In this manner, only subscription radio music will be heard from loud speaker 505 at authorized receiving points when switch arm 504 is in the "subscription radio music" position at contact 545 of switching means 502.

In the event that an attempt is made to mute the audio system of unauthorized receivers, it will first be necessary to ascertain the frequency of the security control carrier at any given period, then determine the precise modulating frequencies $f_a$ and $f_b$ of the security control signals, and finally, effect separation between these control signals of frequencies $f_a$ and $f_b$ and the decoy signals within several cycles of the control frequencies.

Ordinary tuned relays in unauthorized receivers will tend to be activated at random intervals through the automatic transmission of the decoy pulse transmitter 210 of Fig. 1. Thus, unless the frequency of the security subcarrier is known in advance and unless the exact control frequencies $f_a$ and $f_b$ also are known in advance, together with all details of operation, it is anticipated that unauthorized receivers would not operate satisfactorily in rendering the subscription service.

It is anticipated, in this connection, that transmitted coding frequency combinations of the security control signal oscillator 153, including capacitors 152 and 160 (Fig. 1), will be changed from time to time by the subscription radio service and that the tuned reed relays at the receiver will be changed accordingly to provide added protection against unauthorized reception of the subscription radio music without interruption of the announcements. To aid in this direction, the tuned-reed relays 534 and 535 may be of plug-in type so that relays of different frequency response may be readily substituted.

The general functioning of the security system of the invention is in general analogous to the cooperating action of a lock and its key. The security subcarrier of specific frequency corresponds to the matched longitudinal elements of the lock and key; the specific control frequencies $f_a$ and $f_b$ correspond to the varying notches in the profile of the key which must actuate certain tumblers of the lock in predetermined combination before the lock can be opened.

Figure 4:
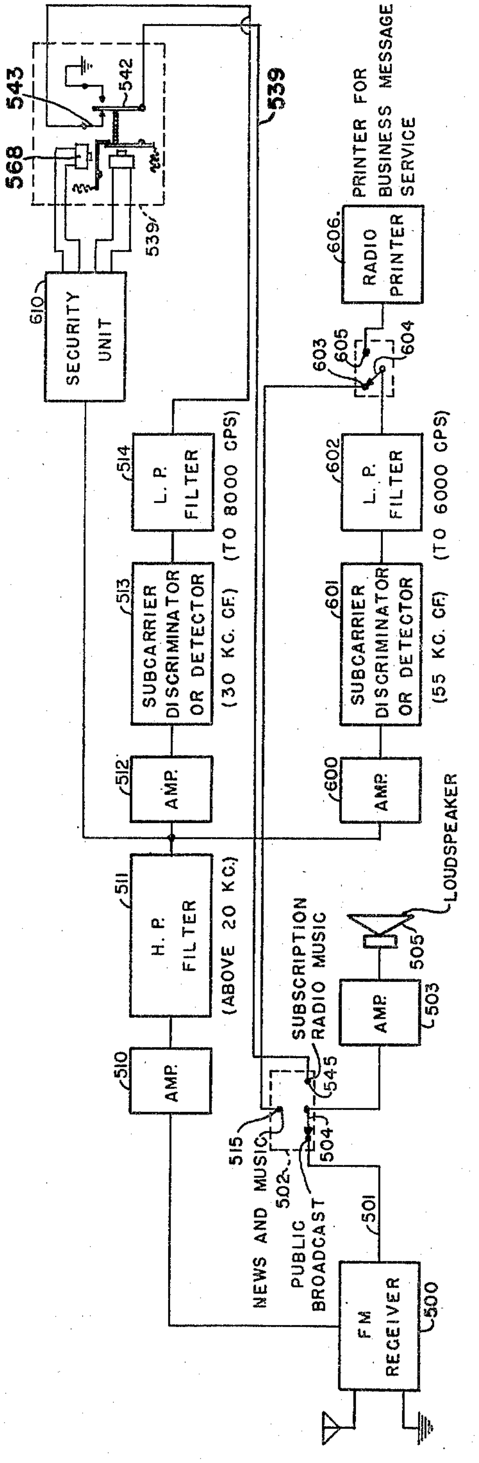
Fig. 4 is a similar to Fig. 3 except that additional means are shown whereby a second multiplex program of specific type may be selected at a subscription radio receiving point, with means for reproducing the signals received on the subscription radio subcarrier channel either by sound reproducing means or by graphic or other signal reproducing means.

Referring to Fig. 4, an illustrative arrangement as shown whereby the subscription radio listener is enabled to have a selection of two different types of subcarrier programs utilizing an FM broadcast receiver tuned to the local FM broadcast station that provides the subscription radio service in addition to its public broadcast programs.

In this instance, the audio output 501 of FM broadcast receiver 500 is connected to program selector switch 502, at the contact marked "Broadcast" as described in connection with Fig. 3. The arm 504 of program selector switch 502 is connected to the input of the audio amplifier 503 whose output is connected to loud speaker 505, as has been described in Fig. 3. The subcarrier signals are derived from the discriminator of the FM receiver 500, as will be described in further detail in subsequent paragraphs, and are applied to amplifier 510 and high-pass filter 511.

The subcarrier at a frequency above 20 kilocycles, flows through the high-pass filter 511 to amplifier 512 and thence to the subcarrier discriminator or detector 513. The audio frequency output of the subcarrier discriminator or detector 513 flows through the low-pass filter 514 to the contact arm 542 of locking relay 539, as has been previously described in connection with Fig. 3. When contact arm 542 is in the "lock-in" position, as shown in the drawing, the audio frequency signals from low-pass filter 514 are applied to the contact 545 of switching means 502, marked "subscription radio music," as has been described in the above paragraphs, permitting only musical selections to be heard.

It will be noted in the arrangement of Fig. 4 that the output circuit of high-pass filter 511 is also connected to an amplifier 600, the output of which is connected to a subcarrier discriminator or detector 601 operable at a mean carrier frequency of 55 kilocycles, for example.

The function of the subcarrier discriminator 601 is to demodulate the second program subcarrier emitted by a broadcasting station providing the subscription radio service. The audio frequency output of the discriminator is applied through low-pass filter 602 to switch arm 604 and contact 603, thence to contact 515 of program selector switch 502 marked "news." The arm 604 may be moved to contact 605 to apply radio printer signals to any well-known form of radio printing device 606, in the event that the second subcarrier is employed to convey printer control signals from time to time. The radio printer may take the form of a Teletype machine, ticker-tape unit or other graphic recording device.

As has been previously described in connection with Fig. 1, the subscription radio broadcast station may have as a second subcarrier program transmission a continuously-available news summary of recurrent type. It will be seen, therefore, that if the business message source 250, Fig. 2, is employed to provide recurrent news program at a subcarrier frequency of 55 kilocycles the listener at the subscription radio receiver will always hear a news summary when the arm 504 of program selector switch 502 is on contact 515 marked "news."

In the diagram of Figure 4, it will be noted that the general arrangement for attaining the security of uninterrupted reception of music is similar to that of Figure 3, except for slight variations in the connections to relay 539. The block 610 marked "Security Unit" is identical to the block 610 of Figure 3, and comprises the elements shown therein.

Figure 5:
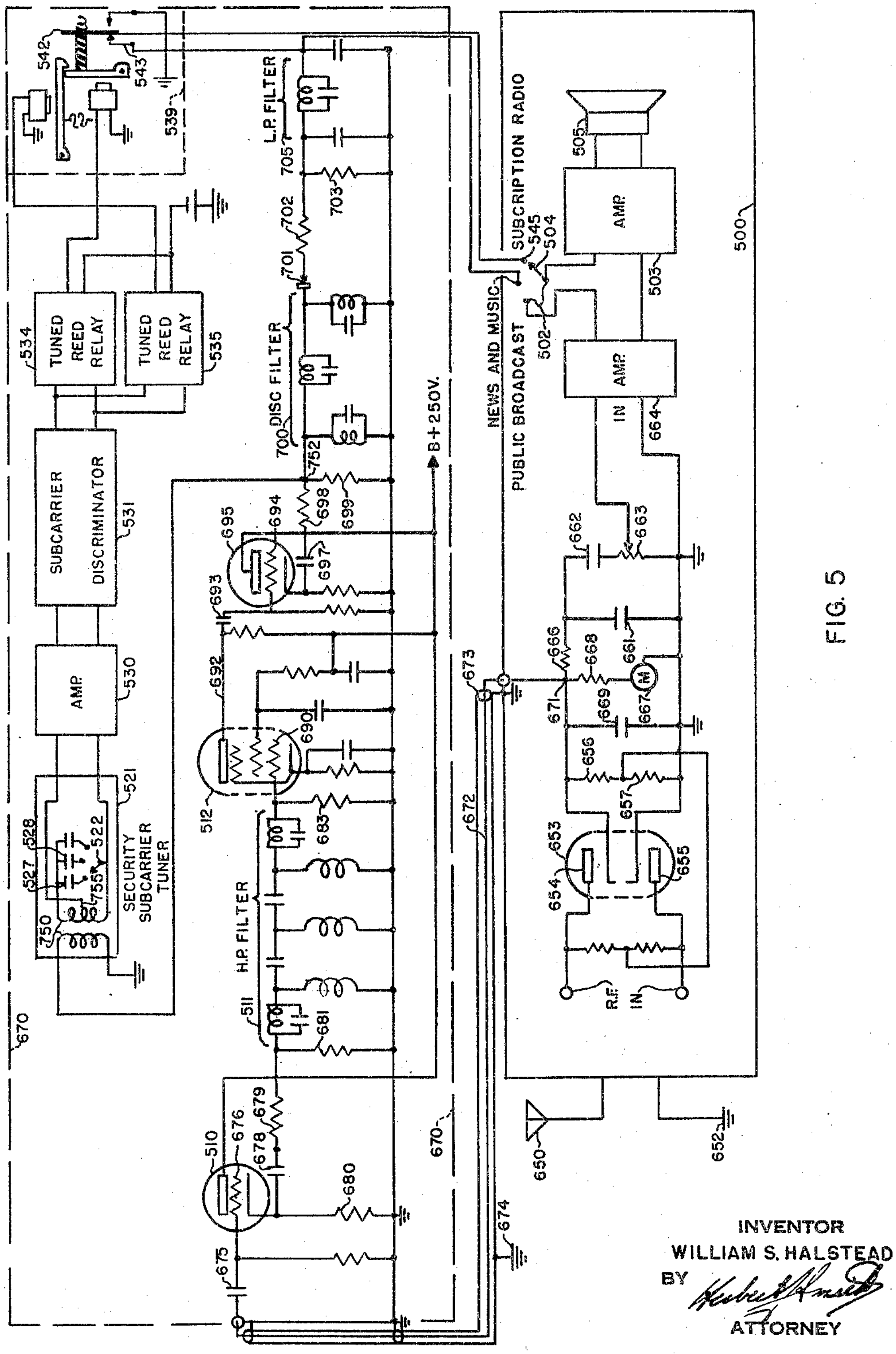
Fig. 5 shows in further detail the circuits and components employed in an illustrative arrangement of subscription-radio receiver whereby security of uninterrupted reception of special musical programs addressed to subscription radio receiving points is attained including one form of subcarrier discriminator used with the system of the invention.

Referring to Fig. 5, the detail of circuit connections of subcarrier receiving equipment and conventional FM broadcast receiving equipment is illustrated in one form. FM broadcast receiver 500, of any well-known type having an antenna 650 and ground connection 652 utilizes a standard balanced FM discriminator in which vacuum tube 653 is employed. The radio frequency input is applied in well-known manner to the anodes 654 and 655 of the tube 653. The discriminator output circuit includes resistors 656 and 657 in well known balanced circuit connection. Tuning meter 667 and associated resistor 668 are utilized in well-known manner as shown to indicate when the receiver is properly tuned to the carrier frequency. Capacitor 669 is a conventional R.-F. by-pass condenser. The audio frequency output of the discriminator is applied to a standard 75-microsecond de-emphasis network consisting of resistor 666 and capacitor 661 after which the de-emphasized audio signals are passed through coupling capacitor 662 and volume control potentiometer 663 to the input of audio amplifier 664. The audio frequency output of amplifier 664 is applied to the contact marked "public broadcast" on switching means 502, the arm 504 being connected to the input of audio amplifier 503 which supplies audio driving power to loud speaker 505.

The subcarrier receiver 670 is connected to the output of discriminator tube 653 at terminal 671, as illustrated. The connection 672 between the FM receiver and the subcarrier receiver 670 may be of shielded type in which the shield 673 is connected to ground 674 as shown. The inner conductor 672 is connected to capacitor 675 of the subcarrier receiver thereby permitting the application of subcarrier signals to the control grid 676 of cathode follower tube 510. The cathode follower output of tube 510 is conventional and comprises capacitor 678, resistor 679 and load resistor 681. Cathode series resistor 680 is connected to ground as shown.

The signal energy appearing across load resistor 681 is applied to the input of high-pass filter 511 of any suitable well-known type. Proper loading of the high-pass filter is effected by resistor 683 as shown. Subcarrier signal energy above 20 kilocycles after passage through the filter 511 is applied to the control grid 690 of amplifier tube 512 in conventional manner. The plate circuit output 692 of tube 512 is connected through coupling capacitor 693 to the control grid 694 of cathode follower tube 695. The cathode follower output circuit comprising capacitor 697, resistor 698 and load resistor 699 is then connected to the input of subcarrier discriminator filter 700. Subcarrier discriminator filter 700 may be of any suitable well-known type providing a frequency response whose slope characteristic in the cut-off region is substantially linear over the subcarrier range occupied by the subcarrier program signal during modulation. In this instance, where a subcarrier having a center frequency of 30 kilocycles is employed the discriminator response should be linear in the general range between the frequencies of about 20 and 40 kilocycles, assuming that an FM subcarrier is used, swinging within approximate limits of plus or minus 8 kilocycles with respect to the center frequency of 30 kilocycles.

The attenuating characteristics of high-pass filter 511 and discriminator filter 700 combine to provide great attenuation of the main aural program signals below 15 kilocycles.

The rectifier 701 in the output circuit of discriminator 700, Fig. 5, may be of well-known crystal-diode type or of vacuum tube type. The rectified signal voltage is then applied through series resistor 702 and load resistor 703 to the input of a low-pass filter 705 of any suitable well-known type, this low-pass filter being designed to pass without attenuation audio frequency signals below 10 kilocycles and to reject the subcarrier frequency in the range above 20 kilocycles.

The design of the low-pass filter 705 may be such as to provide a desired degree of de-emphasis to the rectified subcarrier program signal. It will be noted in this connection by reference to Fig. 1 that a pre-emphasis unit 123 is shown in the output circuit of the subscription music source 119. This pre-emphasis network in well-known manner emphasizes the higher audio frequencies of the subscription music channel. At the subscription subcarrier receiver 670, Fig. 5, these higher audio frequencies are attenuated by the de-emphasis characteristic of low-pass filter 705.

It is understood that in lieu of this particular arrangement for de-emphasis, a standard 75-microsecond de-emphasis network or other suitable network may be used. The output of low-pass filter 705 is applied to the contact 543 of locking relay 539, as has been described previously in connection with Fig. 3. The contact armature 542 of locking relay 539 is connected to contact 545 of selector switch 502 thereby causing the application of subcarier program signals to audio amplifier 503 of FM broadcast receiver 500 when the switch arm 504 is in the "subscription radio" position.

The security subcarrier tuner 521 comprises coil 750 tuning capacitors such as 527, 528 and selector switch 522, all of which form a part of the subcarrier tuner 521 as illustrated. Subcarrier energy above 20 kilocycles is applied to the input of the subcarier tuner 521 through connections of conductor 751 at the output terminal 752 of cathode follower tube 695. When the security subcarrier tuner 521 is properly tuned to the security subcarrier frequency effective signal voltage is applied to the input of amplifier 530 and thence to the subcarrier discriminator 531 as has been described in connection with Fig. 3. The subcarrier discriminator 531 may be similar in general respects to the discriminator filter 700 and includes a rectifier such as 701 and series and load resistors such as 702 and 703 but is effective over the range 30–70 kilocycles. Discriminator 531 then applies audio frequency security pulses to the tuned reed relays 534 and 535 as illustrated in detail in Fig. 3. These tuned reed relays are connected to the locking relay 539 as also is illustrated in detail in the diagram of Fig. 3.

It will be noted that the security subcarrier tuner has its output circuit connection 755 at a point of low relative impedance, in the secondary coil of tuning transformer 750 while the tuning capacitors 527 and 528 are connected across the total secondary winding through the switch 522. Such an arrangement provides a tuning circuit having an extremely sharp tuning characteristic thereby providing an added degree of protection against reception of unwanted subcarrier signals by the security subcarrier tuner.

While, from the foregoing description of the illustrative arrangement of units employed in the multiplex system of the invention a particular arrangement of circuits has been shown, it is to be understood that the scope of the invention is not limited to the arrangement of parts as depicted or to the particular choice of subcarrier frequencies as has been described or to the use of a frequency-modulation subcarrier.

It is to be understood that single side band subcarriers may be used in lieu of a single frequency-modulation subcarrier, and various types of subcarriers, detectors and security control devices may be utilized in lieu of the illustrated forms of equipment.

The phrase "security of reception of subscription radio programs of a given type" implies that radio programs intended for reception by subscribers or other authorized receiving points will, through the security control means, be heard at these authorized points only without intrusion of vocal announcements or signals of undesired type.

While the illustrative arrangement of the system of the invention refers to audio signals from a "public program source," such as block 100, Fig. 1, it is to be understood that signals of any suitable type from a primary signal source corresponding to public program source 100 may be utilized in directly modulating the main radio carrier or primary carrier. Likewise it is to be understood that signals of any suitable type from a secondary source or plurality of secondary sources such as "subscription radio music source" block 119, Fig. 2, may be utilized in modulating the subcarrier from its associated subcarrier, or secondary carrier source or sources, such as shown in block 40.

The device identified as "radio printer," block 606, Fig. 4, may be any device responsive to control by signal energy or control voltage received from a remote point. Such device 606 may be any suitable form of engraving machine, whereby a plate employed in printing newscopy is engraved by means of signals from a remote point, or such device may be a business machine or combination of business machines of various types such as accounting and computing machines responsive to control signals from a remote point. Further, such device 606 may be any suitable means utilized for telemetering, teleselector and remote control functions.

While a preferred embodiment with certain modifications of the invention is shown herein, it is to be understood that variations, modifications and changes may be made within the spirit of the subjoined claims.

What is claimed as new and desired to be secured by Letters Patent of the United States is:

1. A radio broadcast transmitter in a radio broadcasting system including a radio receiver responsive to said transmitter, said transmitter having a main radio carrier and means for frequency-modulating said carrier by first aural program signals within the audio-frequency range, said modulating means including means for frequency-modulating said main radio carrier concurrently by a first subcarrier of frequency above the limits of audibility, a source of second aural program signals comprising time-spaced selections suitable for reproduction at only certain receiving points and means for modulating said subcarrier thereby, a source of third audio signals unsuitable for reception at said certain points and means for modulating said first subcarrier thereby in the intervals between said selections, a second subcarrier of pulse characteristic and means for modulating said main radio carrier thereby during intervals only between said selections, said second subcarrier having a frequency different from that of said first subcarrier a first control signal source of a first predetermined frequency, a second control signal source of a second predetermined frequency, and means for modulating said second subcarrier alternatively by said control signals, a source of decoy signals having characteristics similar to those of said first control signals and differing therefrom only slightly in frequency, and means for modulating said second subcarrier at random intervals by said decoy signals.

2. A radio broadcasting system according to claim 1, which includes means in each subcarrier channel establishing the modulation depth of the main carrier by said subcarriers together to provide a substantially constant frequency deviation of the main carrier within a first percentage value of a certain maximum frequency deviation considered as 100% modulation, and additional means establishing the modulation depth of the main carrier by said first aural program signals to provide a frequency deviation of the main carrier thereby within a second percentage value no greater than the difference between said first value and 100%, said first value being substantially less than said second value.

3. A radio broadcasting system comprising a frequency-modulation radio broadcast transmitter having means for modulating its main radio carrier wave by first aural program signals within the audio-frequency range, means for concurrently moduating said carrier wave by a first and a second subcarrier, each of different frequency above audibility, means for modulating said first subcarrier by second aural program signals comprising selections suitable for reproduction at only certain receiving points, means for moduating said first subcarrier by intrusion signals unsuitable for reproduction at subscriber points, means for moduating said second subcarrier by security control signals, and means at said certain receiver points for receiving all of said signals, including signal-reproducing means and selective means actuated by said security control signals for securing reproduction of said selections with non-reproduction of said intrusion signals.

4. In a frequency-modulated radio broadcast transmitter in a radio broadcasting system including a radio receiver responsive to said transmitter, said transmitter being adapted for use in a system for attaining security of radio reception of multiplexed programs of a first type free from intrusion by undesired signals of a second type, said transmitter having means for generating a main carrier, means for moduating said carrier, means for impressing on the main carrier a first subcarrier of frequency above the limit of audibility, means for alternately modulating said first subcarrier with audio program signals from a first source and subsequently with audio signals from a second source, means for impressing on said main carrier a second subcarrier differing in frequency from said first subcarrier and above the limit of audibility, said second subcarrier being of pulse characteristic, and means for alternately modulating said second subcarrier with one or the other of two control signals differing in frequency, in simultaneous time relation with said alternate modulation of said first subcarrier by said audio signals from said first and second sources.

5. A radio receiver responsive to a main frequency-modulation broadcast carrier of given frequency and having a frequency-modulation carrier demodulator, a high-pass filter coupled to the output of said frequency-modulation demodulator, first subcarrier demodulating means coupled to the output of said filter, means for selectively reproducing audio signals derived from said frequency-modulation carrier demodulator or said subcarrier demodulator, second subcarrier responsive means coupled to the output of said filter, locking relay means coupled to the output of said second subcarrier responsive means selectively responsive to a plurality of received security control signals of different frequencies, said relay means having two positions and including means actuated in response to one of said control signals to lock said relay means, and actuated in response to the other of said control signals to unlock said relay means, and circuit connections between said relay means and said first subcarrier demodulating means and between said relay and the reproducing means such that in one position said relay means serves to render said reproducing means operative to reproduce audio signals from said first subcarrier demodulator or from said frequency-modulation carrier demodulator and in the other position to render said reproducing means inoperative.

6. In a radio broadcasting system, the combination with a radio broadcast transmitter according to claim 1 of means for receiving all of said signals at at least one of said certain points including muting means responsive to said first control signals and unresponsive to said decoy signals to render said third audio signals inaudible during said intervals between said selections, said muting means being also responsive to said second control signals to render audible said second aural program signals.

7. In a radio broadcasting system, the combination with a radio broadcast transmitter according to claim 4 of means responsive to a first of said control signals for automatically selecting for reproduction said audio program signals only in the interval following reception of said first control signal and responsive to the second of said control signals to effect non-reproduction of said audio signals from said second source in the interval following reception of said second control signal.

8. A radio receiver responsive to a main frequency-modulation broadcast carrier of given frequency and having a frequency-modulaion carrier demodulator, a high-pass filter coupled to the output of said frequency-modulation demodulator, first subcarrier demodulating means coupled to the output of said filter, means for selectively reproducing audio signals derived from said subcarrier demodulator, second subcarrier responsive means coupled to the output of said filter, locking relay means coupled to the output of said second subcarrier responsive means selectively responsive to a plurality of received security control signals of different frequencies, said relay means having two positions and including means actuated in response to one of said control signals to lock said relay means, and actuated in response to the other of said control signals to unlock said relay means, and circuit connections between said relay means and said first subcarrier demodulating means and between said relay means and the reproducing means such that in one position said relay means serves to render said reproducing means operative to reproduce audio signals from said first subcarrier demodulator and in the other position to render said reproducing means inoperative.

9. A radio receiver responsive to a main frequency-modulation broadcast carrier, said carrier being frequency-modulated with first and second subcarriers each of different frequency above audibility, said first subcarrier being modulated with subscriber program signals comprising time-spaced audio selections suitable for reproduction at subscriber receiver points and also modulated during the periods between said selections with intrusion signals unsuitable for reproduction at said points, said second subcarrier comprising first and second security control signals of different frequencies, said receeiver having demodulator means adapted to demodulate said broadcast carrier, a high-pass filter coupled to the output of said demodulator, first and second subcarrier wave-responsive means coupled to the output of said filter, said first wave-responsive means having coupled thereto an audio output circuit in which appear both said suitable and unsuitable signals, said second wave-responsive means being responsive to said first and second security control signals, and selective control means connected to said first and second wave-responsive means, said control means including a signal controlling circuit and being operable in response to one of said security control signals to render said unsuitable signals ineffective in said audio output circuit and alternatively operable in response to the other of said security control signals to render said suitable signals effective in said audio output circuit.

10. In a radio receiver, the combination with a radio receiver according to claim 9, said second subcarrier also comprising decoy signals transmitted at random intervals having characteristics similar to those of said first and second security control signals, said selective control means including means unresponsive to said decoy signals.

11. In a radio receiver, the combination with a radio receiver according to claim 9, said second subcarrier comprising first and second security control signals of pulse characteristics, said selective control means including meeans responsive to said pulse signals.

References Cited in the file of this patent

UNITED STATES PATENTS

| | | |
|---|---|---|
| 1,733,609 | Kuhn | Oct. 29, 1929 |
| 2,146,301 | Knotts et al. | Feb. 7, 1939 |
| 2,233,183 | Roder | Feb. 25, 1941 |
| 2,245,347 | Koch | June 10, 1941 |
| 2,282,971 | Koch | May 12, 1942 |
| 2,321,651 | Caraway, Jr. | June 15, 1943 |
| 2,340,798 | Deal | Feb. 1, 1944 |
| 2,392,672 | Koch | Jan. 8, 1946 |
| 2,410,276 | Eilenberger | Oct. 29, 1946 |
| 2,421,727 | Thompson | June 3, 1947 |
| 2,476,337 | Varian | July 19, 1949 |